April 26, 1927. 1,625,933

J. BING

FRICTION BODY FOR MULTIPLE DISK CLUTCHES AND THE LIKE

Filed March 19, 1926

Inventor:
J. Bing
By: Marks & Clerk
Att'ys

Patented Apr. 26, 1927.

1,625,933

UNITED STATES PATENT OFFICE.

JULIUS BING, OF EISENACH, GERMANY, ASSIGNOR TO MAGNET-WERK G. M. B. H. EISENACH SPEZIALFABRIK FUR ELEKTROMAGNET-APPARATE, OF EISENACH, GERMANY.

FRICTION BODY FOR MULTIPLE-DISK CLUTCHES AND THE LIKE.

Application filed March 19, 1926, Serial No. 96,058, and in Germany April 20, 1925.

My invention relates to friction clutches and more particularly to those that have a large number of annular friction bodies arranged in series, such as are usually known as laminated or multiple disk clutches.

If such clutches are inserted in toothed wheel gearings or continuous shafts the changing of any worn friction rings causes serious difficulties since for this purpose the entire gearing has to be taken to pieces or the shaft removed from its bearings in order to enable the annular friction bodies to be taken out. This disadvantage is of such great importance from a practical point of view that for many purposes laminated clutches cannot on this account be used at all.

The object of my invention is to provide a friction body of the kind set forth, which will render possible the convenient insertion in and removal from the clutch in question without complicated dismantling of the latter or of the associated gearing. This result is attained by making the individual friction bodies or friction rings in two parts which each have the frictional covering on one side and by their other sides are laid one upon the other and connected with one another, each of the two partial rings being itself subdivided, by radial joints for example, and the two partial rings being connected with one another in such a way that the dividing lines or joints between the two partial rings are in staggered relationship to one another when the partial rings are assembled.

The invention is illustrated by way of example in one constructional form in the accompanying drawings, wherein—

Figure 1:
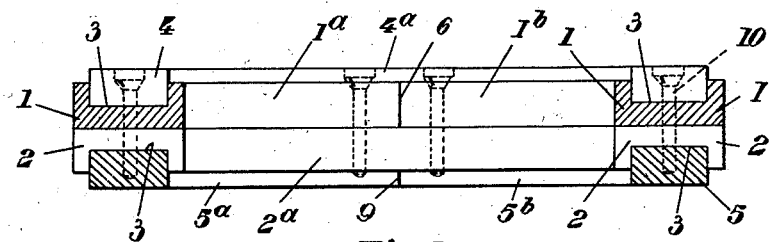
Figure 2:
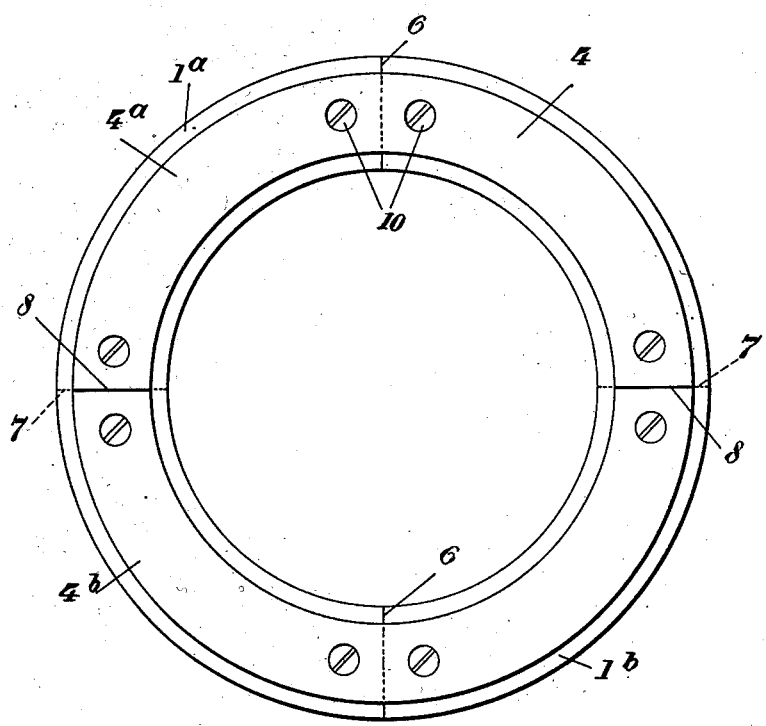

Fig. 1 shows a friction ring constructed according to the invention in central section passing perpendicularly to the plane of the ring through the opposite joints of one of the partial rings, while Fig. 2 shows the ring in side elevation.

In the constructional form illustrated the friction body comprises two preferably symmetrically shaped supporting rings 1 and 2 made of metal, for instance steel, which as shown in Fig. 1 are placed one upon the other with their flat sides in contact. Each supporting ring is provided on its free or outer side with an annular groove 3, these two grooves serving for the reception of the actual friction rings 4 and 5 which are also annular in shape. These preferably consist of a material having particularly good frictional properties, for example asbestos, cotton or wire fabric impregnated with artificial resin, varnish or indiarubber and then hardened.

Each of the two supporting rings 1 and 2 is subdivided, as shown in Fig. 2, by two radial cuts or joints 6, 6 and 7, 7, respectively, at positions located diametrically opposite to one another, into two half ring pieces 1$^a$ and 1$^b$, 2$^a$ and 2$^b$ respectively. The actual friction bodies or coverings 4 and 5 are correspondingly subdivided by cuts or dividing joints 8 and 9 respectively. Upon the friction body being assembled the two supporting rings 1 and 2 as well as the frictional coverings 4 and 5 are superposed in such a way that the dividing joints 6 and 7 and preferably also the dividing joints 8 and 9 are in staggered relationship to one another. In the case forming the basis of the illustration it is assumed that the angle of displacement amounts to 90°, so that the dividing joints 6 and 9 on the one hand and 7 and 8 on the other hand come to lie one above the other in common planes. That the dividing joints both of the two rings 1 and 2 and of the friction coverings or friction rings 4 and 5 should be staggered just by 90° is however of course not essential. The important thing is that the dividing joints of adjacent ring systems should not register with one another.

The connecting of the two supporting rings 1 and 2 with one another and also that of the friction coverings or friction rings 4 and 5 with the supporting rings is effected by means of screws 10, which are passed in the neighbourhood of the dividing joints on the one side through the frictional covering in question, the associated supporting ring, and the connecting second supporting ring, right into the opposite frictional covering and are secured in the latter by being screwed into it. The heads of the screws as shown in Fig. 1 are sunk some distance into the frictional material and their other ends stop a certain distance short of the surface of the frictional covering in question, so that the screws even after a considerable amount of wear of the frictional covering has taken place do not affect the opposite frictional surfaces.

Owing to the nature of the connection described between the various members a rigid unitary annular body is produced, which can conveniently be taken to pieces when occasion requires by loosening the screws 10, so that the changing of any worn ring is possible without difficulty.

Of course the individual ring systems need not necessarily be subdivided at two places only.

The arrangement described can also be employed not only in the case of friction clutches but also in the case of friction brakes or the like.

What I claim is:—

1. In a friction body for friction clutches and the like, a supporting ring comprising two sectors, an adjacent friction ring comprising two sectors, the sectors of the friction ring being secured to the sectors of the supporting ring in such a way that all dividing joints between the sectors of the friction ring are in staggered relationship to the joints between the sectors of the adjacent supporting ring.

2. In a friction body for friction clutches and the like, a supporting ring comprising two sectors, a friction ring adjacent said supporting ring and comprising two sectors, each of the ends of said sectors lying immediately opposite an end of another of said sectors, the sectors of one of said rings being secured to the sectors of the other of said rings in such a way that all joints between the neighbouring sector ends of one of said rings are in staggered relationship to the joints between the neighbouring sector ends of the other one of said rings.

3. In a friction body for friction clutches and the like, a supporting ring comprising two sectors, a friction ring comprising two sectors bearing with their flat sides against the flat sides of the sectors of said supporting ring in such a way that the dividing joints between the sectors of the friction ring do not register with the dividing joints between the sectors of the supporting ring, and means for rigidly securing the sectors of one of said rings to the sectors of the other one of said rings.

4. A friction body for friction clutches and the like comprising a supporting ring consisting of at least two parts, a friction ring consisting of at least two parts, a third ring consisting of at least two parts adapted to be connected with said supporting ring to form a rigid unit.

5. A friction body for friction clutches and the like comprising a supporting ring consisting of at least two parts, a friction ring consisting of at least two parts, a third ring consisting of at least two parts bearing on said supporting ring in such a way that the dividing joints between the parts of said third ring are in staggered relationship to the joints between the parts of said supporting ring and means for rigidly connecting said supporting ring with said third ring.

6. A friction body for friction clutches and the like comprising a supporting ring consisting of at least two parts, a friction ring consisting of at least two parts, a second supporting ring consisting of at least two parts adapted to be connected with said first-mentioned supporting ring and a second friction ring adapted to be firmly connected with said second supporting ring.

7. A friction body for friction clutches and the like comprising two supporting rings each consisting of at least two parts with their flat sides bearing against one another in such a way that the dividing joints between their parts do not register with one another, means for rigidly connecting said rings with one another, and two friction rings each consisting of at least two parts one of which is connected with one of said supporting rings and the other of which is connected with the other of said supporting rings.

8. A friction body for friction clutches and the like comprising two supporting rings each consisting of at least two parts with their flat sides bearing against one another in such a way that the dividing joints between their parts do not register with one another, means for rigidly connecting said rings with one another, and two friction rings each consisting of at least two parts one of which is connected with one of said supporting rings and the other of which is connected with the other of said supporting rings, in such a way that the dividing joints between the parts of each friction ring are in staggered relationship to the dividing joints between the parts of the adjacent supporting ring.

9. A friction body for friction clutches and the like comprising two metallic supporting rings each divided into halves and having their flat sides bearing against one another in such a way that the dividing joints between the two halves of one ring are in staggered relationship to the dividing joints between the two halves of the other ring, annular grooves in the non-adjacent sides of said supporting rings, two friction rings each divided into halves fitted into separate grooves, the dividing joints between the halves of the friction rings being in staggered relationship to the dividing joints between the halves of the adjacent supporting rings and means for firmly connecting said supporting rings with one another.

10. A friction body for friction clutches and the like comprising two metallic supporting rings each divided into halves and having their flat sides bearing against one another in such a way that the dividing joints between the two halves of one ring are in staggered relationship to the dividing joints between the two halves of the other ring substantially through a right angle, annular grooves in the non-adjacent sides of said supporting rings, two friction rings each divided into halves fitted into said grooves and connected with the adjacent supporting rings, the dividing joints between the halves of the friction rings being displaced through substantially a right angle in relation to the dividing joints between the halves of the adjacent supporting rings, and means for connecting all of said rings to form a unitary rigid annular body.

In testimony whereof I have signed my name to this specification.

JULIUS BING.